(12) United States Patent
Keetle

(10) Patent No.: US 8,910,360 B1
(45) Date of Patent: Dec. 16, 2014

(54) FLOATING INSERT REMOVAL TOOL

(75) Inventor: Lee James Keetle, Kingston, WA (US)

(73) Assignee: The Boeing Company, Chicago, IL (US)

( * ) Notice: Subject to any disclaimer, the term of this patent is extended or adjusted under 35 U.S.C. 154(b) by 1290 days.

(21) Appl. No.: 12/630,112

(22) Filed: Dec. 3, 2009

(51) Int. Cl.
*B23B 35/00* (2006.01)
*B23B 51/00* (2006.01)

(52) U.S. Cl.
CPC .................... *B23B 51/0054* (2013.01)
USPC ............. 29/402.08; 408/1 R; 408/80; 408/84; 408/96; 408/203.5

(58) Field of Classification Search
USPC .............. 408/79–82, 84, 96, 200, 201, 203.5, 408/204–206, 68, 1 R; 29/402.08, 402.03
See application file for complete search history.

(56) References Cited

U.S. PATENT DOCUMENTS

| | | | | |
|---|---|---|---|---|
| 1,231,551 A | * | 7/1917 | Alexander | 408/200 |
| 1,332,898 A | * | 3/1920 | Hossie et al. | 408/82 |
| 1,941,551 A | * | 1/1934 | Gjertsen | 408/200 |
| 3,752,593 A | * | 8/1973 | Fitzgerald et al. | 408/1 R |
| 3,825,362 A | | 7/1974 | Hougen | |
| 3,944,379 A | * | 3/1976 | Elrod | 408/79 |
| 4,131,384 A | | 12/1978 | Hougen | |
| 4,203,692 A | * | 5/1980 | Jensen | 408/96 |
| 4,261,093 A | * | 4/1981 | Steffen et al. | 29/426.4 |
| 4,271,740 A | | 6/1981 | Yamazaki et al. | |
| 4,352,610 A | | 10/1982 | Yankovoy et al. | |
| 4,408,935 A | | 10/1983 | Miyanaga | |
| 4,682,399 A | * | 7/1987 | Heimbach | 29/426.4 |
| 4,749,315 A | * | 6/1988 | Mills | 408/209 |
| 4,940,370 A | * | 7/1990 | Gipson | 408/72 R |
| 4,973,208 A | | 11/1990 | Gauron | |
| 5,743,682 A | * | 4/1998 | Chaney, Sr. | 408/79 |
| 6,725,697 B1 | * | 4/2004 | Leadon | 70/465 |

FOREIGN PATENT DOCUMENTS

| | | | | |
|---|---|---|---|---|
| EP | 1348528 A2 | * | 10/2003 | |
| GB | 2197044 A | * | 5/1988 | |
| JP | 61152309 A | * | 7/1986 | |
| JP | 09327818 A | * | 12/1997 | |
| JP | 11333796 A | * | 12/1999 | |
| JP | 2001009618 A | * | 1/2001 | |
| JP | 2009148872 A | * | 7/2009 | |
| WO | WO 2009074776 A1 | * | 6/2009 | |

OTHER PUBLICATIONS

"NMC Ultra Light Honeycomb Panel Fasteners", Nylon Molding Corporation, pp. 1-2, retrieved Dec. 2009 www.nmcgroup.com.

* cited by examiner

*Primary Examiner* — Daniel Howell
(74) *Attorney, Agent, or Firm* — Yee & Associates, P.C.

(57) ABSTRACT

An apparatus may comprise a shaft, a cutter, and a sleeve. The shaft may have a first end, a second end, and an axis extending through the shaft. The cutter may be associated with the shaft and may have a first channel configured to receive the first end of the shaft and a portion of the shaft. The sleeve may be configured to move along the axis within the first channel of the cutter, may have a second channel configured to receive the first end of the shaft and the portion of the shaft, and may be configured to be biased away from the second end of the shaft.

17 Claims, 7 Drawing Sheets

FLOATING INSERT REMOVAL TOOL

BACKGROUND INFORMATION

1. Field

The present disclosure relates generally to manufacturing and, in particular, to a method and apparatus for reworking parts. Still more particularly, the present disclosure relates to a method and apparatus for removing inserts from a structure.

2. Background

Aircraft are being designed and manufactured with greater and greater percentages of composite materials. Some aircraft may have more than 50 percent of their primary structure made from composite materials. Composite materials may be used in parts and structures for aircraft to decrease the weight of the aircraft. This decreased weight may improve payload capacities and fuel efficiencies. Further, composite materials may provide longer service life for various parts and structures in an aircraft.

Composite materials may be tough, light-weight materials created by combining two or more dissimilar components. For example, without limitation, a composite part may include fibers and resins. The fibers and resins may be combined to form a cured composite material.

Further, by using composite materials, portions of an aircraft may be created in larger pieces or sections. For example, without limitation, a fuselage in an aircraft may be created in cylindrical sections that may be put together to form the fuselage of the aircraft. Other examples may include, for example, without limitation, wing sections joined to form a wing or stabilizer sections joined to form a stabilizer.

In the interior of an aircraft, composite panels may be used in various locations in the aircraft. For example, without limitation, panels may be used to form floors, walls, closets, galleys, and other areas within the cabin of an aircraft. A composite panel may have a honeycomb core with a face sheet on each side.

These composite panels may be assembled and attached to other panels or structures using inserts. These inserts may be placed within a panel. These inserts may have cores with threads. Screws, bolts, and other fastener systems may be used with these inserts to attach a panel to another panel or another structure. These inserts may be made of metal. In an effort to reduce the weight in an aircraft, plastic inserts may be used in place of metal inserts.

Removal of composite panels after they have been fastened into an assembly may require time and expense. In some cases, the inserts in the composite panels may require removal for replacement. This process also takes time and expense. The time and expense may increase the time needed to deliver an aircraft or the time for aircraft maintenance. As a result, aircraft delivery may be delayed or an aircraft may be out of service longer than desired.

Therefore, it would be advantageous to have a method and apparatus that takes into account one or more of the issues discussed above, as well as possibly other issues.

SUMMARY

In one advantageous embodiment, an apparatus may comprise a shaft, a cutter, and a sleeve. The shaft may have a first end, a second end, and an axis extending through the shaft. The cutter may be associated with the shaft and may have a first channel configured to receive the first end of the shaft and a portion of the shaft. The sleeve may be configured to move along the axis within the first channel of the cutter, which may have a second channel configured to receive the first end of the shaft and the portion of the shaft, and may be configured to be biased away from the second end of the shaft.

In another advantageous embodiment, a removal tool may comprise a shaft, a cutter, a sleeve, and a spring. The shaft may have a first end, a second end, and an axis extending through the shaft. The second end of the shaft may be configured to be attached to a drill. The cutter may be associated with the shaft and may have a first channel configured to receive the first end of the shaft and the portion of the shaft. The cutter may comprise a cylinder, a plurality of blades, and slots between the plurality of blades. The slots may be configured to have a length greater than a depth of a plastic insert, and the slots may have a shape configured to remove debris generated by the cutter cutting the plastic insert. The plastic insert may have a movable metal nut within an opening in the plastic insert. The cutter may be removably attached to the shaft. The sleeve may be configured to move along the axis within the first channel of the cutter, may have a second channel configured to receive the first end and the portion of the shaft, and may be configured to be biased away from the second end of the shaft. The sleeve may have an end configured to engage the opening in the plastic insert while the cutter rotates against the plastic insert. The first end of the shaft may have a flange configured to retain the first end of the shaft within the second channel of the sleeve. The spring may have a first end and a second end. The first end of the spring may contact a base portion of the shaft and the second end of the spring may contact the end of the sleeve. The spring may be configured to bias the sleeve to move along the axis away from the second end of the shaft. The base portion of the shaft may have a first engagement feature, and the cutter may have a second engagement feature at a first end of the cutter and the plurality of blades at a second end of the cutter.

In yet another advantageous embodiment, a method may be present for removing a plastic insert with a movable metal nut from a composite panel. A removal tool may be positioned relative to the plastic insert. The removal tool may comprise a shaft having a first end, a second end, and an axis extending through the shaft. The second end may be configured to be attached to a drill. The removal tool may also comprise a cutter associated with the shaft and may have a first channel configured to receive the first end of the shaft and a portion of the shaft. The cutter may comprise a cylinder, a plurality of blades, and slots between the plurality of blades. The slots may be configured to have a length greater than a depth of the plastic insert with the movable metal nut. The slots may have a shape configured to remove debris generated by the cutter cutting the plastic insert. The cutter may be removably attached to the shaft. A sleeve may be configured to move along the axis within the first channel of the cutter and may have a second channel configured to receive the first end of the shaft and the portion of the shaft. The sleeve may be configured to be biased away from the second end of the shaft. The sleeve may have an end configured to engage the plastic insert while the cutter rotates against the plastic insert. The first end of the shaft may have a flange which may be configured to retain the first end of the shaft within the second channel of the sleeve.

A spring may have a first end and a second end. The first end of the spring may contact a base portion of the shaft and the second end of the spring may contact the end of the sleeve. The spring may be configured to bias the sleeve to move along the axis away from the second end of the shaft. The base portion of the shaft may have a first engagement feature, and the cutter may have a second engagement feature at a first end of the cutter and a plurality of blades at the second end of the cutter. The removal tool may be rotated to cut the plastic insert. Rotation of the removal tool may be stopped after the plastic insert becomes separated from the composite panel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
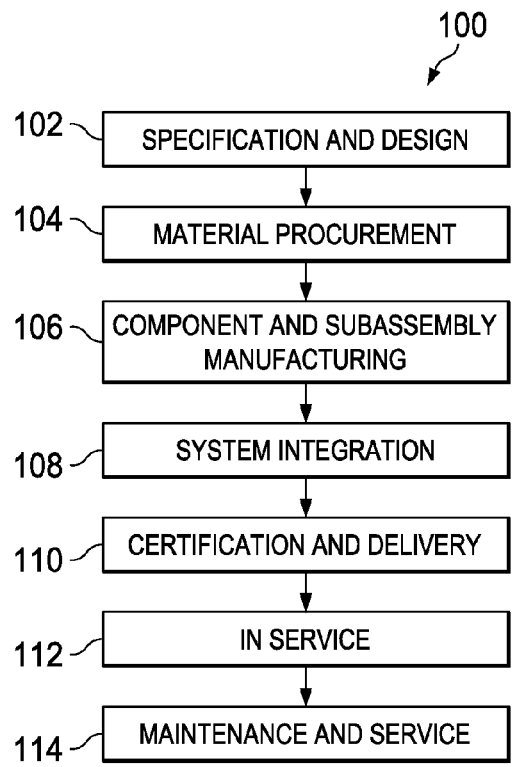
FIG. 1 is an illustration of an aircraft manufacturing and service method in accordance with an advantageous embodiment.
Figure 2:
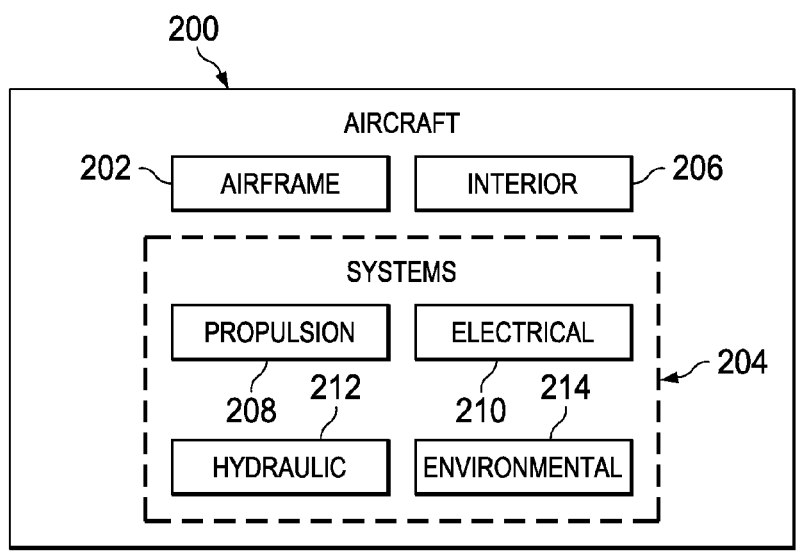
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, without limitation, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. As one particular example, the different advantageous embodiments may employ a removal tool configured to remove plastic inserts from components in the form of composite panels. This removal may occur in a manner that may reduce rework or replacement of composite panels for aircraft 200.

A number of, when referring to items, means one or more items. For example, without limitation, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, without limitation, the different advantageous embodiments recognize and take into account that inserts may be associated with composite panels using a potting material. The potting material may flow with the insert in place and solidify to hold the insert within the composite panel. Sometimes the inserts may need to be removed. With metal inserts, the inserts may be removed through resistive heating.

The resistive heating may cause the metal inserts to conduct heat such that the material holding the metal inserts in place in the composite panel may be removed. This removal may be performed in a manner that avoids undesired inconsistencies in the composite panel. Then, a new insert may be placed into the panel and held in place with a potting material.

The different advantageous embodiments also recognize and take into account that with plastic inserts, a floating metal nut may be present. This nut may receive a fastener, such as a screw or a bolt. This metal nut, however, may not conduct sufficient heat when resistive heating is used to soften the potting material holding the insert in place in the composite panel.

The different advantageous embodiments recognize and take into account that these inserts may be removed using a cutting tool. The different advantageous embodiments recognize and take into account that currently available cutting tools may catch the metal nut in the plastic insert. This metal element may move and cause the cutting tool to move or jump. With this type of movement, the tool may create undesirable inconsistencies in the composite panel. For example, without limitation, the tool may create a hole bigger than a desired size, a hole with an undesired shape, a hole in an undesired location, or some other unsuitable type inconsistency. As a result, the panel may need to be reworked or replaced.

Thus, the different advantageous embodiments provide a method and apparatus for removing inserts. In one advantageous embodiment, an apparatus comprises a shaft, a cutter, and a sleeve. The shaft may have a first end, a second end, and an axis extending through the shaft. The cutter may be associated with the shaft and may have a first channel configured to receive the first end and a portion of the shaft. The sleeve may be configured to move along an axis within the first channel of the cutter and may have a second channel configured to receive the first end and the portion of the shaft. The sleeve may be configured to be biased away from the second end of the shaft.

Figure 3:
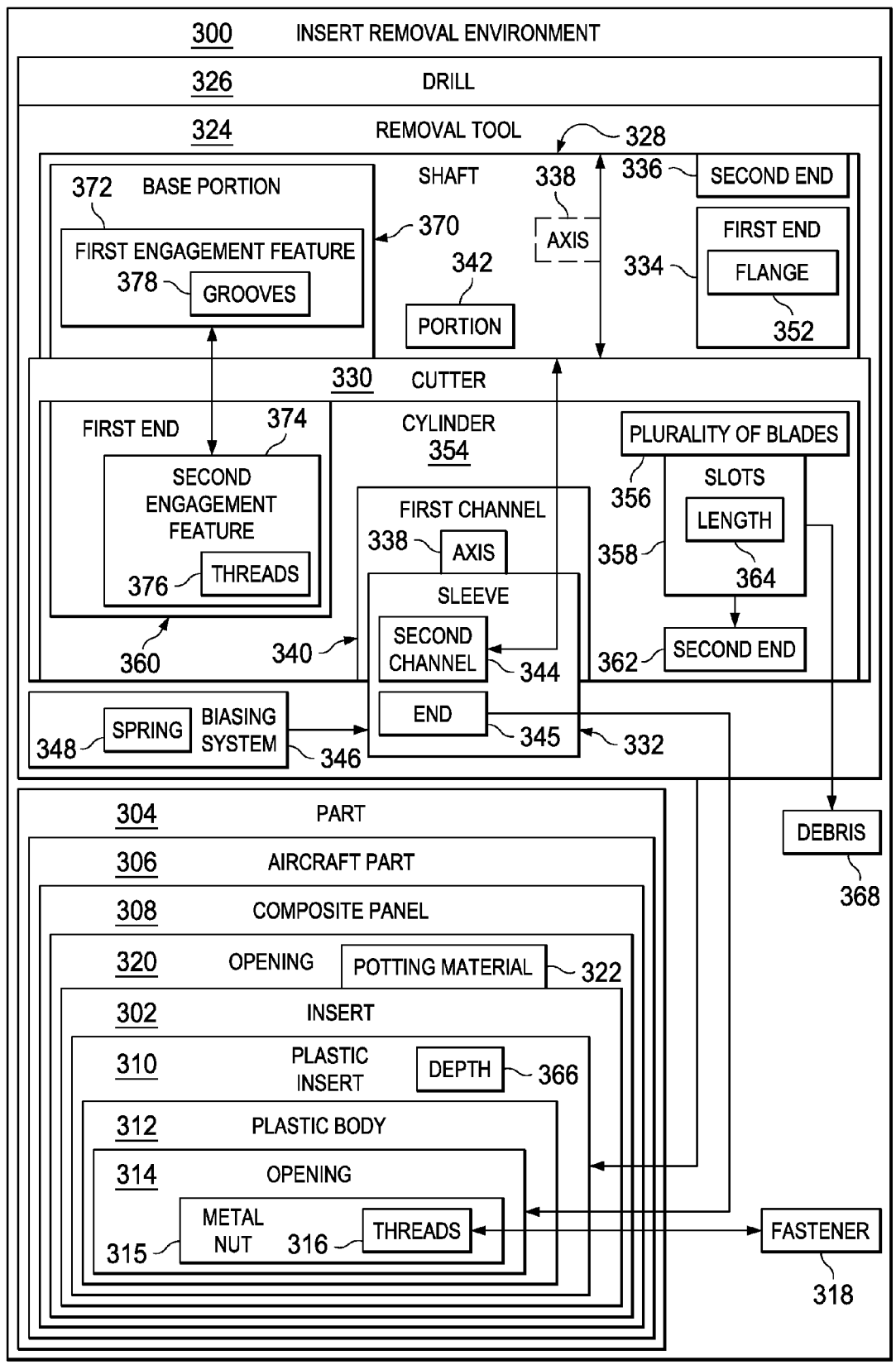
FIG. 3 is an illustration of an insert removal environment in accordance with an advantageous embodiment.

With reference now to FIG. 3, an illustration of an insert removal environment is depicted in accordance with an advantageous embodiment. Insert removal environment 300 in FIG. 3 is an illustration of an environment that may be used during aircraft manufacturing and service method 100 in FIG. 1. Insert removal environment 300 may be used with aircraft 200 in FIG. 2.

In these illustrative examples, insert removal environment 300 may be used to remove insert 302 from part 304. In these illustrative examples, part 304 may take the form of aircraft part 306. In particular, part 304 may be composite panel 308 for aircraft 200 in FIG. 2. In this example, insert 302 may take the form of plastic insert 310. Plastic insert 310 may have plastic body 312 and opening 314 in plastic body 312. Plastic body 312 may contain metal nut 315 within opening 314. Metal nut 315 may be comprised of metal and may include threads 316. Threads 316 may receive fastener 318 to secure composite panel 308 or other parts to secure composite panel 308. In these examples, metal nut 315 may float or move within plastic body 312.

In these illustrative examples, plastic insert 310 may be associated with composite panel 308. Plastic insert 310 may be located in opening 320 of composite panel 308. Plastic insert 310 may be fixed within opening 320 using potting material 322. In this manner, plastic body 312 may be fixed, while metal nut 315 may move within plastic body 312. In these examples, potting material 322 may be a two-part glass filled thermoset epoxy. Potting material 322 may be mixed and then dispensed and/or pumped into opening 320 with plastic insert 310 in place to secure plastic insert 310 in opening 320.

In these illustrative examples, it may be desirable to remove plastic insert 310 from composite panel 308. For example, without limitation, threads 316 of metal nut 315 may become worn or may have inconsistencies. In other advantageous embodiments, another insert having a different thread size than threads 316 of metal nut 315 may be desired.

In these illustrative examples, plastic insert 310 may be removed using removal tool 324. Removal tool 324 may be attached to drill 326. Removal tool 324 may be positioned with respect to plastic insert 310 and rotated to cut plastic insert 310.

In these illustrative examples, removal tool 324 may comprise shaft 328, cutter 330, sleeve 332, and other suitable components. Shaft 328 may have first end 334 and second end 336. Axis 338 may extend through shaft 328. In these illustrative examples, axis 338 extends centrally through shaft 328.

Cutter 330 may be associated with shaft 328. Cutter 330 may have first channel 340, which may be configured to receive first end 334 and portion 342 of shaft 328.

A first component may be considered to be associated with a second component by being secured to the second component, bonded to the second component, fastened to the second component, and/or connected to the second component in some other suitable manner. The first component also may be connected to the second component by using a third component. The first component also may be considered to be associated with the second component by being formed as part of and/or an extension of the second component. Additionally, the first and second components may be removably attached or connected to each other.

Sleeve 332 may be configured to move along axis 338 within first channel 340 of cutter 330. Sleeve 332 may have second channel 344, which may be configured to receive first end 334 and portion 342 of shaft 328. Further, sleeve 332 may be configured to be biased away from second end 336 of shaft 328. Sleeve 332 may have end 345, which may be configured to engage opening 314 in plastic body 312 of plastic insert 310.

In these illustrative examples, biasing system 346 may be present in removal tool 324 and configured to bias or push sleeve 332 to move along axis 338 away from second end 336 of shaft 328. In other words, biasing system 346 may be configured to apply a force on sleeve 332 in a direction along axis 338 away from second end 336 of shaft 328 such that sleeve 332 engages plastic insert 310 while cutter 330 moves in the direction along axis 338. In these illustrative examples, biasing system 346 may be spring 348.

In these illustrative examples, first end 334 of shaft 328 may have flange 352. Flange 352 may be configured to retain first end 334 of shaft 328 within second channel 344 of sleeve 332.

As depicted, cutter 330 may comprise cylinder 354, plurality of blades 356, slots 358, and/or other suitable features. Cylinder 354 of cutter 330 may have first end 360 and second end 362. Plurality of blades 356 may be located at second end 362.

Slots 358 may be present between plurality of blades 356. Slots 358 may be configured to have length 364. Length 364 may be greater than depth 366 of plastic insert 310. Slots 358 may be configured to remove debris 368 generated by plurality of blades 356 of cutter 330 cutting plastic insert 310.

Cutter 330 may be associated with shaft 328 in these examples. In this example, cutter 330 may be removably associated with shaft 328. For example, without limitation, shaft 328 may have base portion 370. Base portion 370 may have first engagement feature 372. First end 360 of cutter 330 may have second engagement feature 374. First engagement feature 372 and second engagement feature 374 may engage each other to retain cutter 330 on shaft 328.

For example, without limitation, first engagement feature 372 may take the form of grooves 378, and second engagement feature 374 may take the form of threads 376. Threads 376 may engage grooves 378 in these illustrative examples.

In operation, end 345 of sleeve 332 may engage opening 314, while cutter 330 may rotate and cut plastic body 312. In these illustrative examples, sleeve 332 may be moved towards second end 336 of shaft 328 as cutter 330 cuts into plastic body 312. Sleeve 332 may engage opening 314, in this manner, during cutting of plastic body 312 by cutter 330. This cutting may occur in a manner that may avoid cutter 330 from engaging metal nut 315 and jumping or moving off of plastic body 312. Jumps and/or movement off of plastic body 312 may alter opening 320 in an undesirable manner.

In these illustrative examples, shaft 328, cutter 330, and sleeve 332 may be manufactured from a number of different types of materials. The materials selected for these components may be ones that are suitable for use in cutting inserts. For example, without limitation, these different components may be made from steel, aluminum, carbide, titanium, and/or other suitable types of materials.

The illustration of insert removal environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, end 345 of sleeve 332 may engage other portions of plastic insert 310 other than opening 314. For example, without limitation, end 345 may engage other portions of plastic body 312. As yet another example, removal tool 324 may be used to remove inserts in other types of parts other than composite panels for aircraft. For example, without limitation, the different advantageous embodiments may be used to remove inserts from walls in a building or panels located in a ship.

Figure 4:
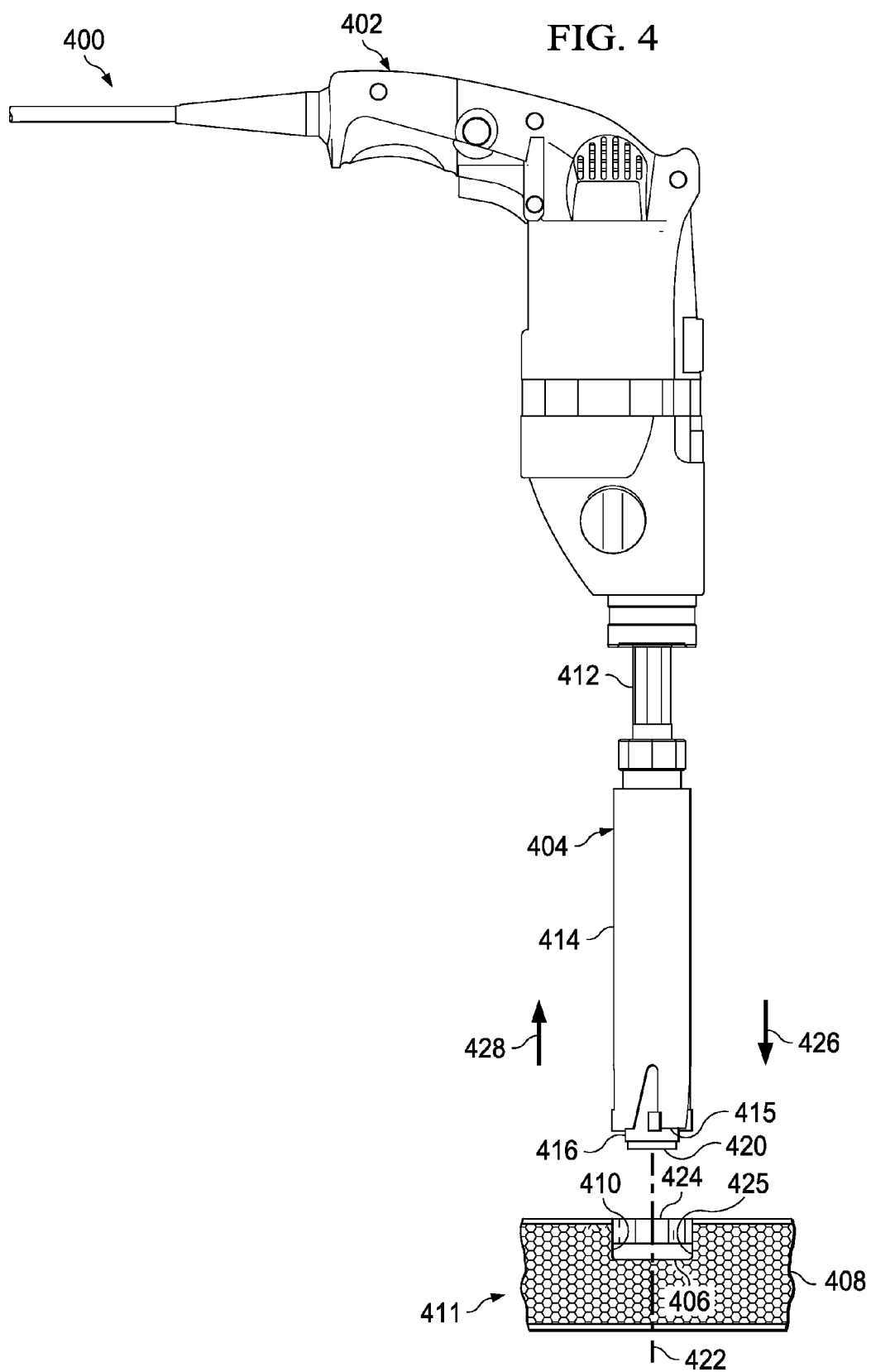
FIG. 4 is an illustration of an insert removal environment in accordance with an advantageous embodiment.

With reference now to FIG. 4, an illustration of an insert removal environment is depicted in accordance with an advantageous embodiment. In this illustrative example, insert removal environment 400 is an example of one implementation for insert removal environment 300 in FIG. 3.

As depicted, insert removal environment 400 may include drill 402 and removal tool 404. Drill 402 and removal tool 404 may be used to remove insert 406 from part 408. In this illustrative example, insert 406 may be plastic insert 410, and part 408 may be composite panel 411.

In this illustrative example, removal tool 404 may include shaft 412, cutter 414, and sleeve 416. End 420 of sleeve 416 may guide cutter 414 along axis 422. Axis 422 may be an axis through shaft 412. End 420 may engage opening 424, while cutter 414 rotates about axis 422. In this manner, sleeve 416 may guide removal tool 404 in a manner that avoids cutter 414 from engaging or cutting metal nut 425 within plastic insert 410.

In these illustrative examples, sleeve 416 may be biased in the direction of arrow 426 against opening 424 in use. As cutter 414 cuts plastic insert 410, cutter 414 may move in the direction of arrow 426. This movement may apply force against end 420 to move sleeve 416 in the direction of arrow 428. In this manner, end 420 and sleeve 416 may maintain contact or engagement with opening 424 during cutting of plastic insert 410.

Figure 5:
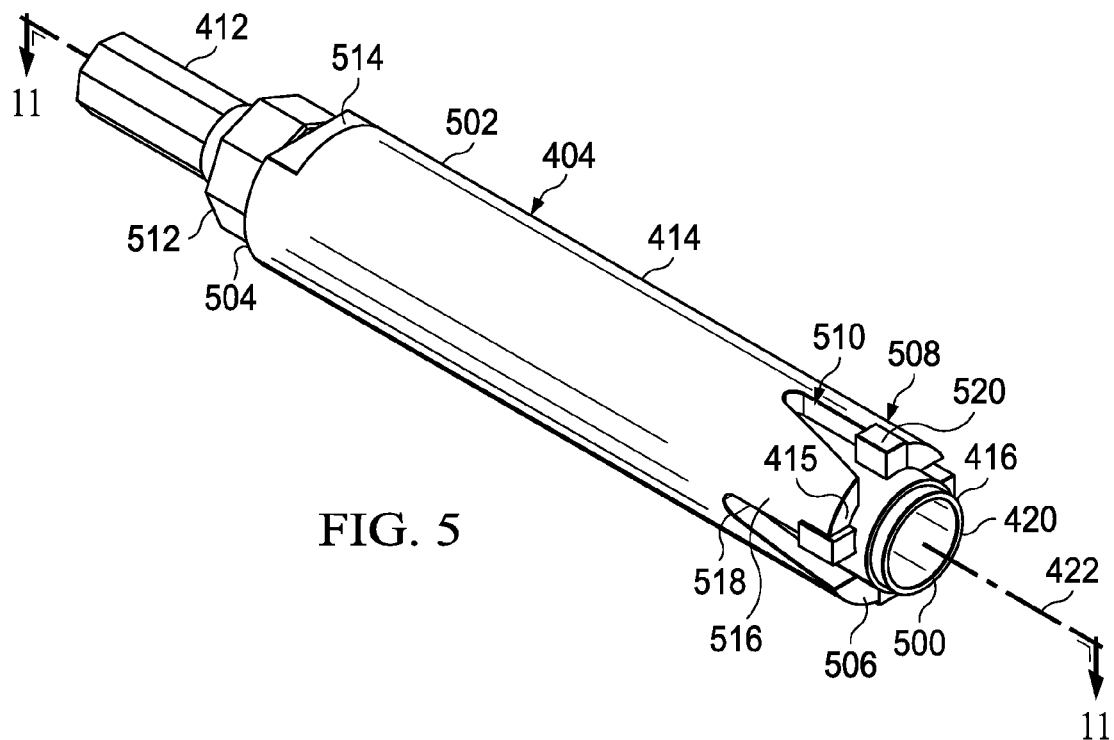
FIG. 5 is an illustration of a removal tool in accordance with an advantageous embodiment.

With reference now to FIG. 5, an illustration of a removal tool is depicted in accordance with an advantageous embodiment. In this illustrative example, a perspective view of removal tool 404 is depicted. As can be seen in this view, end 420 of sleeve 416 has engagement feature 500, which may be configured to engage opening 424 in FIG. 4.

In this illustrative example, cutter 414 may comprise cylinder 502 having first end 504 and second end 506. Plurality of blades 508 may be located at second end 506. Slots 510 may be located between plurality of blades 508. In these illustrative examples, slots 510 may take the form of gullets. In these examples, first end 504 may be adjacent to base portion 512 of shaft 412. Planar surface 514 on cylinder 502 may allow a human operator to tighten or loosen cutter 414. In this manner, cutter 414 may be removed, and another cutter may be replaced when cutter 414 becomes worn.

In this illustrative example, blade 516 may be a blade within plurality of blades 508. Blade 516 may comprise support section 518 and cutting block 520. Support section 518 may be comprised of steel. Cutting block 520 may be comprised of carbide. Blade 516 may provide support and/or strength for cutting block 520. As a result, cutting block 520 may provide additional longevity for cutter 414. Cutting block 520 may be the part of blade 516 that cuts insert 302 in FIG. 3.

Figure 6:
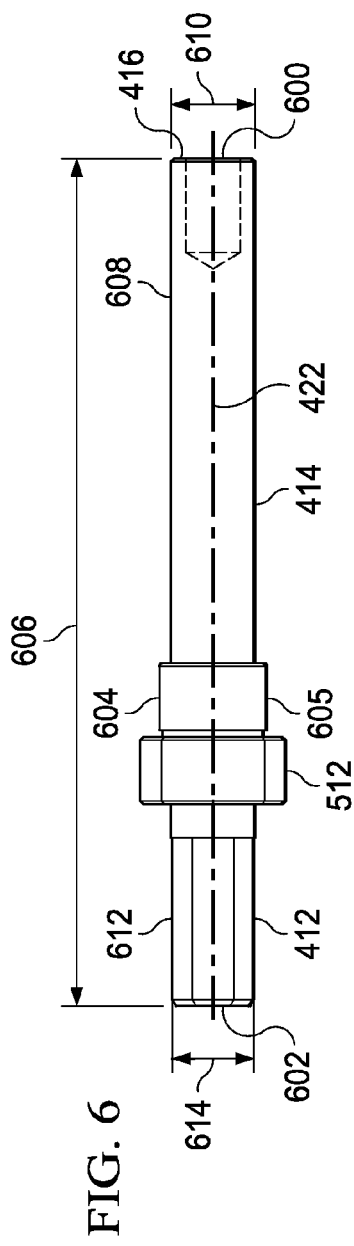
FIG. 6 is an illustration of a side view of a shaft in a removal tool in accordance with an advantageous embodiment.

With reference now to FIG. 6, an illustration of a side view of a shaft in a removal tool is depicted in accordance with an advantageous embodiment. In this illustrative example, shaft 412 may have first end 600 and second end 602. First end 600 may be configured to receive cutter 414 and sleeve 416. Second end 602 may be configured for attachment to a machine such as, for example, without limitation, drill 326 in FIG. 3 or drill 402 in FIG. 4.

In this example, base portion 512 may include engagement feature 604, which may engage cutter 414 to hold cutter 414 on shaft 412. Engagement feature 604 may take the form of threads 605.

In this illustrative example, shaft 412 may have length 606. Length 606 may be about three inches in this illustrative example. In this example, portion 608 of shaft 412 may have diameter 610. Diameter 610 may be about 0.19 inches in this illustrative example. Portion 612 of cutter 414 may have diameter 614. Diameter 614 may be about 0.29 inches.

Figure 7:
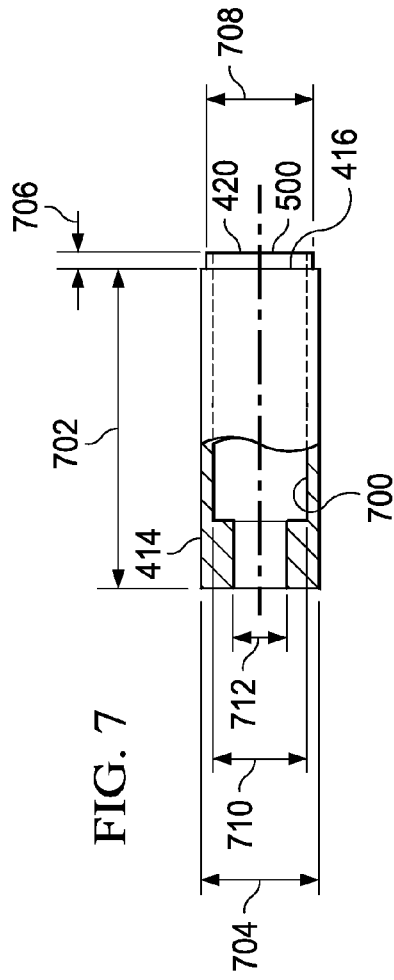
FIG. 7 is an illustration of a side view of a sleeve for a removal tool in accordance with an advantageous embodiment.

With reference now to FIG. 7, an illustration of a partially-exposed side view of a sleeve for a removal tool is depicted in accordance with an advantageous embodiment. In this illustrative example, a side view of sleeve 416 is illustrated. Sleeve 416 may have channel 700.

Sleeve 416 may have length 702. Length 702 may be about 1.25 inches in this example. Sleeve 416 may have diameter 704. Diameter 704 may be about 0.4 inches. In this illustrative example, engagement feature 500 may have length 706. Length 706 may be about 0.06 inches. Additionally, engagement feature 500 may have diameter 708. Diameter 708 may be about 0.325 inches.

Channel 700, in this example, may have diameter 710 and diameter 712. Diameter 710 may be about 0.24 inches, and diameter 712 is about 0.19 inches.

Figure 8:
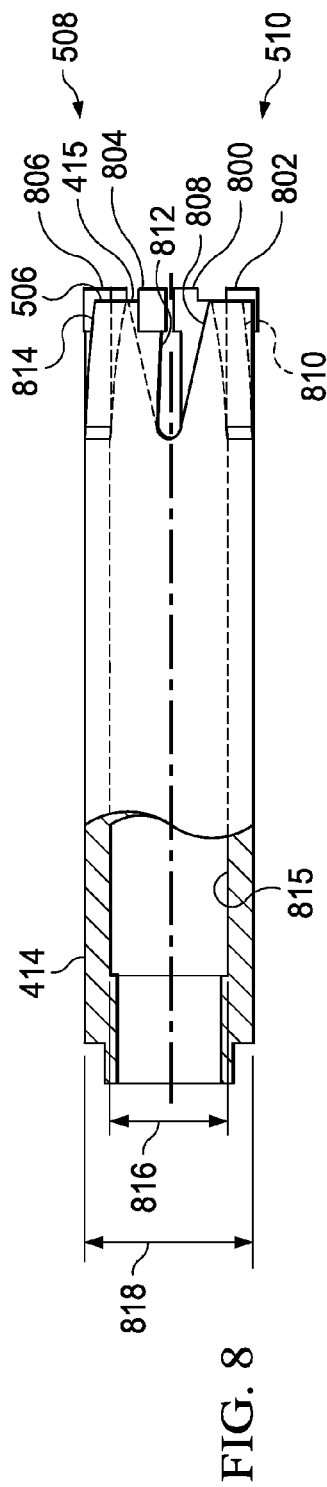
FIG. 8 is an illustration of a side view of a cutter in accordance with an advantageous embodiment.

Turning now to FIG. 8, an illustration of a partially-exposed side view of a cutter is depicted in accordance with an advantageous embodiment. In this illustrative example, plurality of blades 508 may comprise blades 800, 802, 804, and 806. Slots 510 may include slots 808, 810, 812, and 814. In this illustrative example, cutter 414 may have channel 815, which is shown in phantom. Channel 815 may have diameter 816. Diameter 816 may be about 0.4 inches. Cutter 414 may have diameter 818. Diameter 818 may be about 0.555 inches.

Figure 9:
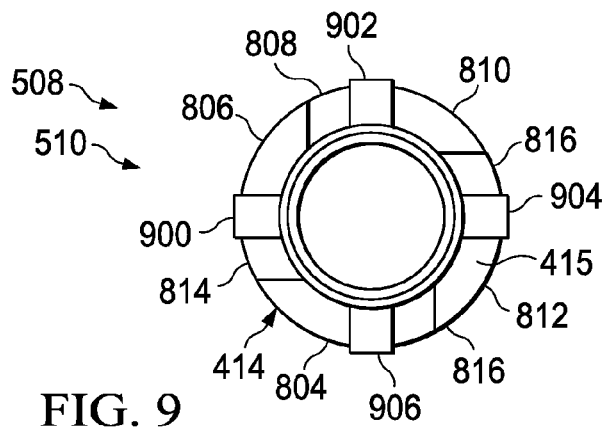
FIG. 9 is an illustration of a view of an end of a cutter with a plurality of blades in accordance with an advantageous embodiment.

With reference now to FIG. 9, an illustration of a view of end 415 of cutter 414 with plurality of blades 508 is depicted in accordance with an advantageous embodiment. In this illustration, a view of blocks 900, 902, 904, and 906 may be seen.

Figure 10:
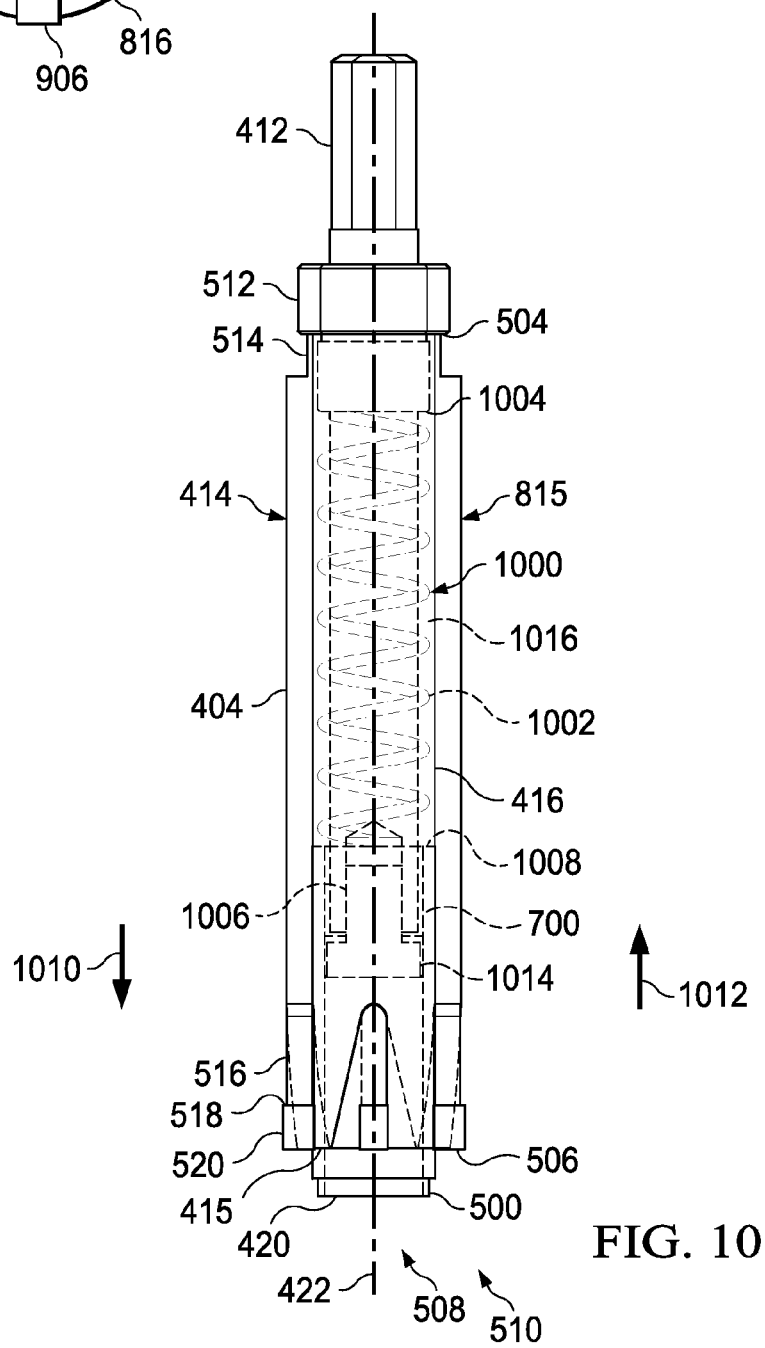
FIG. 10 is an illustration of a side view of a removal tool in accordance with an advantageous embodiment.

Turning now to FIG. 10, an illustration of a side view of a removal tool is depicted in accordance with an advantageous embodiment. In this illustrative example, removal tool 404 is illustrated with biasing system 1000, which is shown in phantom within channel 815 of cutter 414.

In this illustrative example, biasing system 1000 may be spring 1002. Spring 1002 may have first end 1004 and second end 1006. First end 1004 may contact base portion 512 of shaft 412. Second end 1006 may contact end 1008 of sleeve 416. In this illustrative example, spring 1002 may bias or push sleeve 416 in the direction of arrow 1010 along axis 422 as engagement feature 500 encounters force from the movement of cutter 414 in the direction of arrow 1010, sleeve 416 may be moved back in the direction of arrow 1012 towards second end 506 of shaft 412. In these depicted examples, sleeve 416 may be moved back such that end 420 of sleeve 416 may be moved further back than second end 506 of shaft 412.

In this illustrative example, screw 1014 may prevent sleeve 416 from becoming disengaged from shaft 412. As illustrated, at least portion 1016 of shaft 412 may be received within channel 700 of sleeve 416. As depicted, sleeve 416 and portion 1016 of shaft 412 may be located within cutter 414.

Figure 11:
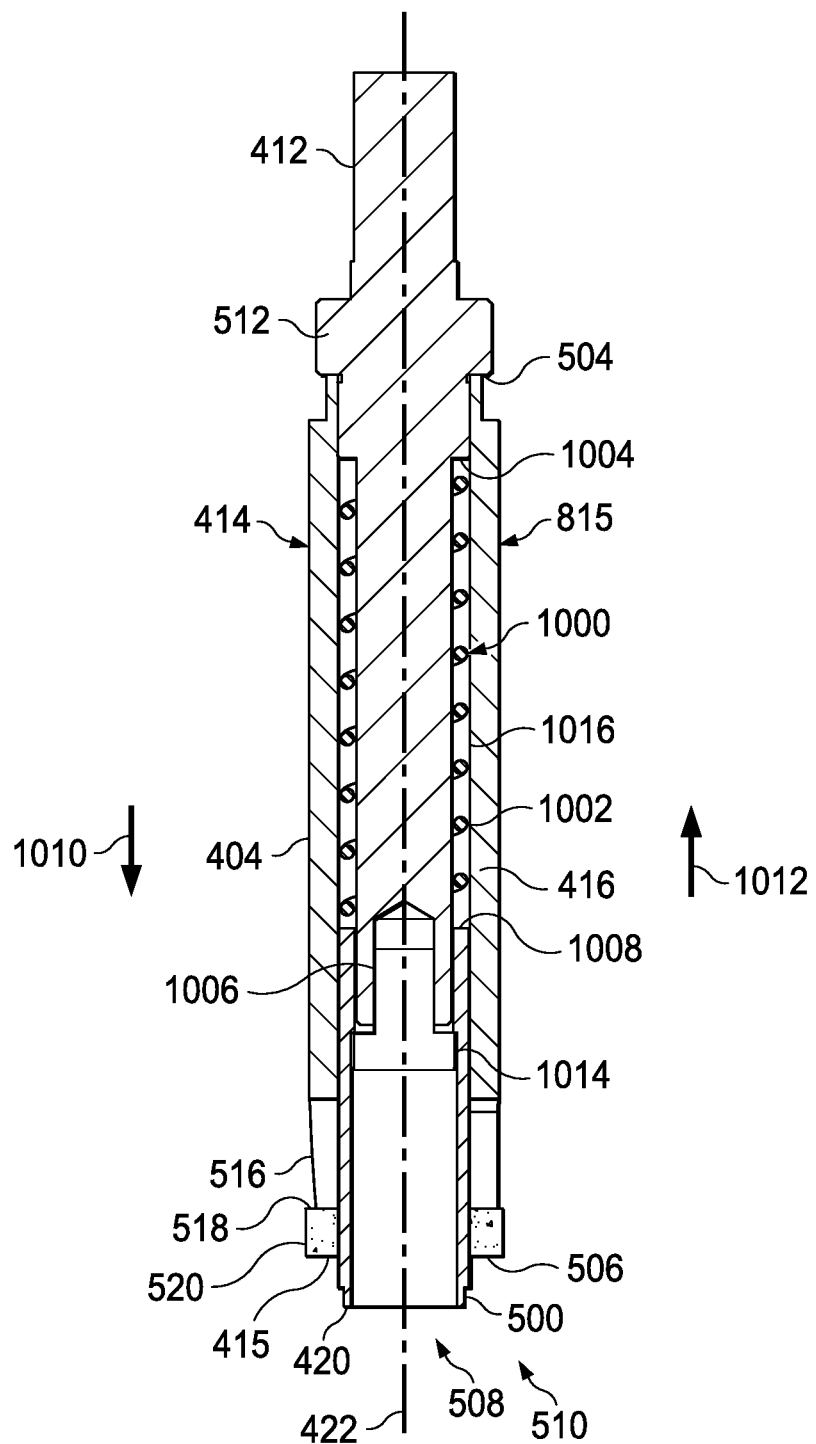
FIG. 11 is an illustration of a cross-sectional view of a removal tool in accordance with an advantageous embodiment.

With reference now to FIG. 11, an illustration of a cross-sectional view of a removal tool is depicted in accordance with an advantageous embodiment. In this illustrative example, a cross-sectional view of removal tool 404 is shown taken along lines 11-11 in FIG. 5. As depicted, end 420 is shown in an extended position.

Figure 12:
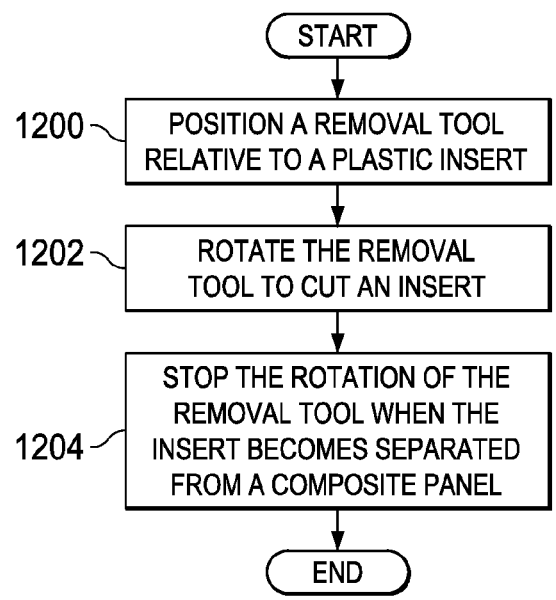
FIG. 12 is an illustration of a flowchart of a process for removing an insert in accordance with an advantageous embodiment.

Turning next to FIG. 12, an illustration of a flowchart of a process for removing an insert is depicted in accordance with an advantageous embodiment. The process illustrated in FIG. 12 may be implemented in insert removal environment 300 in FIG. 3. In this illustrative example, removal tool 324 is positioned relative to plastic insert 310 (operation 1200). In this example, removal tool 324 may be attached to drill 326. Removal tool 324, in this example, comprises shaft 328, cutter 330, and sleeve 332.

Shaft 328 has first end 334 and second end 336 with axis 338 extending through shaft 328. Second end 336 may be configured to be attached to drill 326. Cutter 330 may have first channel 340 configured to receive first end 334 and portion 342 of shaft 328. Sleeve 332 may be configured to move along axis 338 within first channel 340 of cutter 330. Sleeve 332 may have second channel 344 configured to receive first end 334 and at least portion 342 of shaft 328. Sleeve 332 may be configured to be biased away from second end 336 of shaft 328.

Removal tool 324 may be rotated to cut insert 302 (operation 1202). Rotation of removal tool 324 may be stopped when insert 302 becomes separated from composite panel 308 (operation 1204), with the process terminating thereafter.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some advantageous embodiments, operation or rotation of removal tool 324 may be stopped to inspect plastic insert 310 before continuing to cut into plastic insert 310.

Thus, the different advantageous embodiments provide a method and apparatus for removing inserts. In one or more of the different advantageous embodiments, an apparatus comprising a shaft, a cutter, and a sleeve may be present. This apparatus may take the form of a removal tool. The removal tool may allow for removal of plastic inserts without creating or reducing the creation of inconsistencies in parts in which the plastic inserts are present. In the different advantageous embodiments, the sleeve may be configured to provide a guide for the cutter when cutting the plastic insert.

In this manner, the time and expense needed for removing plastic inserts may be reduced. Further, reworking or replacement of parts, such as composite panels, also may be reduced using one or more of the different advantageous embodiments.

The description of the different advantageous embodiments has been presented for purposes of illustration and description, and it is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a shaft having a first end, a second end, and an axis extending through the shaft;
   a cutter associated with the shaft and having a first channel configured to receive the first end of the shaft and a portion of the shaft; and
   a sleeve configured to move along the axis within the first channel of the cutter and having a second channel configured to receive the first end of the shaft and the portion of the shaft and configured to be biased away from the second end of the shaft,
   a biasing system configured to apply a force on the sleeve in a direction along the axis away from the second end of the shaft such that a first end the sleeve engages a plastic insert while the cutter moves in the direction along the axis, wherein the biasing system comprises a spring having a first end and a second end in which the first end of the spring contacts the base portion of the shaft and the second end of the spring contacts a second end of the sleeve;
   wherein the first end of the shaft has a flange configured to retain the first end of the shaft within the second channel of the sleeve, and
   wherein a base portion of the shaft has a first engagement feature, the cutter has a second engagement feature at a first end of the cutter and a plurality of blades at a second end of the cutter, and the first engagement feature and the second engagement feature engage each other to retain the cutter on the shaft.

2. The apparatus of claim 1, wherein the first end of the sleeve is configured to engage an opening in a plastic insert while the cutter rotates against the plastic insert.

3. The apparatus of claim 2, wherein the plastic insert has a movable metal nut within the opening in the plastic insert and the movable metal nut has threads.

4. The apparatus of claim 1, wherein the cutter comprises:
a cylinder having a first end and a second end;
a plurality of blades located at the second end of the cylinder; and
slots between the plurality of blades, wherein the slots are configured to have a length greater than a depth of an insert.

5. The apparatus of claim 4, wherein the slots have a shape configured to remove debris generated by the cutter cutting the insert.

6. The apparatus of claim 1, wherein the cutter is removably associated with the shaft.

7. The apparatus of claim 1, wherein the second end of the shaft is configured to be attached to a drill.

8. The apparatus of claim 7 further comprising:
the drill.

9. A removal tool comprising:
a shaft having a first end, a second end, and an axis extending through the shaft in which the second end of the shaft is configured to be attached to a drill;
a cutter associated with the shaft and having a first channel configured to receive the first end of the shaft and a portion of the shaft in which the cutter comprises a cylinder; a plurality of blades; and slots between the plurality of blades in which the slots are configured to have a length greater than a depth of a plastic insert having a movable metal nut within an opening in the plastic insert and the slots have a shape configured to remove debris generated by the cutter cutting the plastic insert and in which the cutter is removably attached to the shaft;
a sleeve configured to move along the axis within the first channel of the cutter and having a second channel configured to receive the first end of the shaft and the portion of the shaft and configured to be biased away from the second end of the shaft, wherein the first end of the shaft has a flange configured to retain the first end of the shaft within the second channel of the sleeve; and
a biasing system configured to apply a force on the sleeve in a direction along the axis away from the second end of the shaft, wherein the biasing system comprises a spring having a first end and a second end in which the first end of the spring contacts the base portion of the shaft and the second end of the spring contacts a second end of the sleeve in which the base portion of the shaft has a first engagement feature and the cutter has a second engagement feature at a first end of the cutter and the plurality of blades at a second end of the cutter, and the first engagement feature and the second engagement feature engage each other to retain the cutter on the shaft.

10. A method for removing an insert, the method comprising:
positioning a removal tool relative to the insert; and
rotating the removal tool to cut the insert,
wherein the removal tool comprises:
a shaft having a first end, a second end, a base portion, and an axis extending through the shaft;
a cutter associated with the shaft and having a first channel configured to receive the first end of the shaft and a portion of the shaft;
a sleeve configured to move along the axis within the first channel of the cutter and having a second channel configured to receive the first end of the shaft and the portion of the shaft and configured to be biased away from the second end of the shaft; and
a biasing system configured to apply a force on the sleeve in a direction along the axis away from the second end of the shaft such that a first end the sleeve engages a plastic insert while the cutter moves in the direction along the axis, wherein the biasing system comprises a spring having a first end and a second end in which the first end of the spring contacts the base portion of the shaft and the second end of the spring contacts a second end of the sleeve,
wherein the first end of the shaft has a flange configured to retain the first end of the shaft within the second channel of the sleeve, and
wherein a base portion of the shaft has a first engagement feature, the cutter has a second engagement feature at a first end of the cutter and a plurality of blades at a second end of the cutter, and the first engagement feature and the second engagement feature engage each other to retain the cutter on the shaft.

11. The method of claim 10, wherein the insert is located in a composite panel.

12. The method of claim 11 further comprising:
stopping rotation of the removal tool after the insert becomes separated from the composite panel.

13. The method of claim 10, wherein the first end of the sleeve is configured to engage the insert while the cutter rotates against the insert.

14. The method of claim 10, wherein the insert is a plastic insert with a movable metal nut.

15. The method of claim 10, wherein the cutter comprises:
a cylinder;
a plurality of blades; and
slots between the plurality of blades, wherein the slots are configured to have a length greater than a depth of the insert.

16. The method of claim 15, wherein the slots have a shape configured to remove debris generated by the cutter cutting the insert.

17. A method for removing a plastic insert with a movable metal nut from a composite panel, the method comprising:
positioning a removal tool relative to the plastic insert in which the removal tool comprises a shaft having a first end, a second end, and an axis extending through the shaft in which the second end of the shaft is configured to be attached to a drill; a cutter associated with the shaft and having a first channel configured to receive the first end of the shaft and a portion of the shaft in which the cutter comprises a cylinder, a plurality of blades, and slots between the plurality of blades in which the slots are configured to have a length greater than a depth of the plastic insert with the movable metal nut and the slots have a shape configured to remove debris generated by the cutter cutting the plastic insert and in which the cutter is removably attached to the shaft; a sleeve configured to move along the axis within the first channel of the cutter and having a second channel configured to receive the first end of the shaft and the portion of the shaft and configured to be biased away from the second end of the shaft in which the first end of the sleeve is configured to engage the plastic insert while the cutter rotates against the plastic insert and in which the first end of the shaft has a flange configured to retain the first end of the shaft within the second channel of the sleeve; and a biasing system configured to apply a force on the sleeve in a direction along the axis away from the second end of the shaft such that a first end the sleeve engages a plastic insert while the cutter moves in the direction along the axis, wherein the biasing system comprises a spring having a first end and a second end in which the first end of the spring contacts the base portion of the shaft and the second end of the spring contacts a second end of the sleeve;

rotating the removal tool to cut the plastic insert; and stopping rotation of the removal tool after the plastic insert becomes separated from the composite panel.

* * * * *